United States Patent
Annis et al.

(10) Patent No.: US 8,952,081 B2
(45) Date of Patent: Feb. 10, 2015

(54) PROCESS FOR PREPARING LATEX PAINTS CONTAINING BIOCIDES

(75) Inventors: Ioana Annis, Mundelein, IL (US); Mark A. Henning, Barrington, IL (US); John W. Quinn, Skokie, IL (US)

(73) Assignees: Dow Global Technologies LLC, Midland, MI (US); ANGUS Chemical Company, Buffalo Grove, IL (US)

( * ) Notice: Subject to any disclaimer, the term of this patent is extended or adjusted under 35 U.S.C. 154(b) by 306 days.

(21) Appl. No.: 12/740,936

(22) PCT Filed: Nov. 10, 2008

(86) PCT No.: PCT/US2008/082931
§ 371 (c)(1),
(2), (4) Date: Oct. 6, 2010

(87) PCT Pub. No.: WO2009/073309
PCT Pub. Date: Jun. 11, 2009

(65) Prior Publication Data
US 2011/0015299 A1   Jan. 20, 2011

Related U.S. Application Data

(60) Provisional application No. 60/991,315, filed on Nov. 30, 2007.

(51) Int. Cl.
*C09D 5/16* (2006.01)
*C08K 5/47* (2006.01)
*C09D 5/02* (2006.01)
*C09D 17/00* (2006.01)

(52) U.S. Cl.
CPC ............. *C09D 17/001* (2013.01); *C09D 5/025* (2013.01)
USPC .............. 523/122; 524/83; 106/401; 106/503

(58) Field of Classification Search
USPC ....................... 523/122; 106/401, 503; 524/83
See application file for complete search history.

(56) References Cited

U.S. PATENT DOCUMENTS

| | | | |
|---|---|---|---|
| 4,686,239 A | 8/1987 | Rei | |
| 5,229,124 A | 7/1993 | Rei et al. | |
| 5,430,046 A | 7/1995 | Mattox | |
| 6,133,300 A | 10/2000 | Smith et al. | |
| 7,652,048 B2 * | 1/2010 | Bussmann et al. | 514/373 |
| 2006/0106129 A1 * | 5/2006 | Gernon et al. | 523/122 |
| 2008/0227766 A1 | 9/2008 | Wunder et al. | |
| 2008/0274154 A1 * | 11/2008 | Bussmann et al. | 424/405 |

FOREIGN PATENT DOCUMENTS

| | | |
|---|---|---|
| EP | 0453112 B1 | 1/1997 |
| EP | 1508363 B1 | 11/2006 |
| WO | 2004018565 A1 | 3/2004 |
| WO | 200642129 A1 | 4/2006 |
| WO | 2007078598 A2 | 7/2007 |

* cited by examiner

*Primary Examiner* — Kriellion Sanders
(74) *Attorney, Agent, or Firm* — Tifani M. Edwards

(57) ABSTRACT

A process for incorporating water insoluble biocides in latex paint products. The process comprises adding the biocide to the dispersion phase.

4 Claims, No Drawings

PROCESS FOR PREPARING LATEX PAINTS CONTAINING BIOCIDES

CROSS REFERENCE TO RELATED APPLICATIONS

This is a §371 application of PCT International Patent Application Number PCT/US2008/082931 filed Nov. 10, 2008, and claims priority from provisional application Ser. No. 60/991,315 filed Nov. 30, 2007, each of which is incorporated herein by reference in its entirety.

FIELD OF THE INVENTION

The invention relates to a process for incorporating a water insoluble biocide into a water-borne latex paint and to new compositions containing the insoluble biocide.

BACKGROUND OF THE INVENTION

Latex paints are water-borne systems that are generally manufactured by a two-step process. First, a dispersion phase, commonly referred to as the grind phase, is prepared by mixing dry paint pigments with other grind phase components, including most other solid powder formulation materials, under constant high shear agitation to provide a high viscosity and high solids mixture. This part of the process is designed to effectively wet and dis-agglomerate the dry pigments and stabilize them in an aqueous dispersion.

The second step of the paint manufacturing process is commonly referred to as the letdown or thindown phase, because the viscous grind is diluted with the remaining formulation components, which are generally less viscous than the grind mix. Typically, the latex resins, any predispersed pigments, and any other paint materials that only require mixing and perhaps moderate shear, are incorporated during the letdown phase. The letdown phase may be done either by sequentially adding the letdown components into a vessel containing the grind mix, or by adding the grind mix into a vessel containing a premix of the latex resins and other letdown components, followed by sequential addition of the final letdown components. In either case, constant agitation is needed, although application of high shear is not required.

Biocides are typically included in latex paints to provide the paint with resistance to microorganisms. Biocides may be incorporated at different stages of the paint manufacture process, however they are commonly added in the last steps to decrease their exposure to high temperature or potential deactivating reagents.

Several water-insoluble biocides, such as BIT (1,2-benzisothiazol-3(2H)-one), are known to be highly effective at controlling organism growth in aqueous media. However, incorporation of water insoluble biocides in latex paint is challenging because of the potential of the water insoluble material to agglomerate and thus result in paint with unacceptable properties. As a result, incorporation of water insoluble biocides has required that they be delivered as a low-solids solution or dispersion in a solvent, such as a glycol, or as dispersion in water.

The use of solvents for delivering water-insoluble biocides into paints is, however, undesirable for several reasons. Solvents increase the presence of volatile organic compounds (VOCs) both during paint manufacture and in the final paint product. Solvents also add to the material cost of the paint, increase inventory and storage needs, and increase transportation costs. As a consequence, a significant advance in the field, from both a cost and environmental impact perspective, would be the provision of new techniques for incorporating water insoluble biocides into latex paints with limited use of solvents.

BRIEF SUMMARY OF THE INVENTION

In one aspect, the invention provides a process for manufacturing a latex paint composition. The process comprises: preparing a dispersion phase by mixing together one or more pigments, other grind phase components, and a water insoluble biocide; and mixing the dispersion phase with a latex resin and other letdown components.

In another aspect, the invention provides a dispersion phase for use in a latex paint manufacturing process. The dispersion phase comprises: one or more pigments; other grind phase components; and a water insoluble biocide.

DETAILED DESCRIPTION OF THE INVENTION

The invention provides a process for incorporating a water insoluble biocide into a latex paint composition. The process permits the incorporation of the biocide in a VOC-free form. The process also decreases cost both for the paint supplier and the customer, reduces inventory needs (for instance, a 60-85% active formulation of BIT can be used in the invention, rather than a 20% active formulation available through currently used technology), and reduces transportation costs and hazards.

The process of the invention comprises: preparing a grind phase by mixing together one or more pigments, other grind phase components, and a water insoluble biocide; and mixing the grind phase with one or more latex resins and other letdown components.

The grind phase requires mixing dry pigments and other grind phase components into a high viscosity and high solids mixture. Generally, inorganic pigments comprise sub-micron to several micron sized particles of water insoluble inorganic minerals. Inorganic pigments provide the paint film with opacity and control the gloss level, and improve film durability. Inorganic pigments are also used to control the viscosity of the paint. Titanium dioxide, in either rutile or anatase mineral form, is the mostly commonly used opacifying pigment.

Other inorganic pigments, referred to as extender pigments, provide the other benefits described above, and some enhance the opacifying efficiency of the opacifying pigment. Common extender pigments include kaolin clay, calcined kaolin clay, natural or synthetic calcium carbonate, talc, natural or synthetic silicon dioxide, mica, and feldspar.

In addition to inorganic pigments, some paints may also include organic colorant pigments and other specialized pigments. Some pigments may be incorporated into the paint as predispersed aqueous slurries. Otherwise, pigments are added as dry powders to the grind phase.

Co-solvents, such as glycols, including propylene glycol or ethylene glycol, may be added to the grind phase to provide the paint with freeze-thaw stability and aid film formation by slowing the evaporation of the liquid phase after application. Coalescents, such as alcohol ether or ester alcohol solvents, may be added for plasticizing latex particles, and thus enabling or enhancing the particles' ability to coalescence to form the paint film. 2,2,4-Trimethyl-1,3-pentanediol monoisobutyrate is a commonly used coalescent.

Thickeners are generally used to control the rheological properties of the paint formulation from the manufacture process through storage and application. Various types can be used, including associative, non-associative, and thixotropes.

Thickeners described as non-associative (i.e., do not bind to latex particles) are usually soluble cellulosic polymers, such as hydroxyethylcellulose. Associative thickeners include hydrophobically modified cellulosic polymers, hydrophobically-modified alkali-swellable emulsion polymers, and hydrophobically-modified ethoxylated polyurethane resins. Clay or organo-modified clay thickeners, often referred to as thixotropes, may also be used to control certain rheological properties.

Surfactants, added during the grind phase, aid in wetting dry pigment particles during the manufacture process. Surfactants also stabilize the dispersion of the latex against flocculation in the paint formulation and provide the paint with compatibility with tinting dispersions, which are often added by the end user. Nonionic surfactants and anionic surfactants are commonly used. Many commonly used nonionic surfactants are alkyl aryl polyethers. Examples of anionic surfactants include salts of phosphate esters, and alkyl aryl polyether sulfate salts.

Pigment dispersants are also generally used as grind phase additives. Pigment dispersants are soluble materials whose physicochemical adsorption to the surface of pigment particles stabilizes the dispersion of the pigment particles against reagglomeration. Examples of commonly used dispersants are salts of polyacrylic acids or modified polyacrylic acids, and polyphosphate salts such as sodium hexametaphosphate.

Neutralizers are bases which neutralize the acidic components of the formulation, thus raising the pH of the paint formulation to an alkaline level. The resulting surface charges imparted to the latex particles and many types of pigment particles aid in stabilization against flocculation. The most common inorganic bases are ammonia, sodium carbonate, and sodium hydroxide. Most of the organic bases used are alkanolamine compounds, which serve additional functions, including acting as co-dispersants for the pigments. Neutralizers are often added to the grind phase, and may be followed by additional doses added to the letdown.

Defoamers may be added at various times during the manufacturing process to prevent foam formation. Most defoamers are either silicone-based, or mineral oil-based, and some contain hydrophobic silica.

According to the invention, a water-insoluble biocide is also added to the grind phase. By "water-insoluble" is meant a solubility in water of 0.5 wt % or less, more preferably 0.25 wt % or less, and even more preferably, 0.1 wt % or less, at 25° C. Preferably, the biocide should have sufficient chemical and heat compatibility to be able to withstand the harsh conditions of the grind phase mixing step. Examples of suitable biocides include 1,2-benzisothiazol-3(2H)-one (BIT), ortho-phenyl phenol (OPP), alkylisothiazolinones such as octylisothiazolinone (OTT), 3-iodo-2-propynyl-butylcarbamate (IPBC), carbendazim (2-benzimidazolecarbamic acid, methyl ester), chlorothalonil (1,3-dicyanotetrachlorobenzene), diuron (1,1-dimethyl-3-(3,4-dichlorophenyl)urea), azole-based antimicrobials such as tebuconazole (α-[2-(4-chlorophenyl)-ethyl]-α-(1,1-dimethylethyl)-1H-1,2,4-triazole-1-ethanol), propiconazole (1-[[2-(2,4-dichlorophenyl)-4-propyl-1,3-dioxolan-2-yl]methyl]-1H-1,2,4-triazole), and azaconazole (1-[[2-(2,4-dichlorophenyl)-1,3-dioxolan-2-yl]methyl]-1H-1,2,4-triazole), thiabendazole (2-(1,3-Thiazol-4-yl)-1H-benzimidazole; 2-(4'-thiazolyl)benzimidazole), zinc pyrithione, diiodomethyl-para-tolylsulfone, 2-(thiocyanomethylthio)benzthiazole, zinc dimethyldithiocarbamate, Triclosan (2',4',4-trichloro-2-hydroxydiphenyl ether), cybutrin (2-(tert-butylamino)-4-(cyclopropylamino)-6-(methylthio)-1,3,5-triazine), terbutryn (2-ethylamino-4-methylthio-6-tert-butylamino-1,3,5-triazine), N-alkyl-substituted BIT such as N-butyl-BIT, dihalo-substituted alkylisothiazolinones such as dichlorooctylisothiazolinone (DCOIT), and mixtures of two or more thereof. A particularly suitable biocide is BIT.

The biocide is added to the grind phase either as a solid or as a high-solids formulation, such as dispersion in water or other liquid. Other additives may be included to facilitate addition of the biocide, such as flow agents or surfactants. The biocide may be added directly or it may be packaged, for example, in water-soluble bags to increase ease of handling.

When the biocides is delivered as a high solids formulation, the formulation preferably contains at least about 50%, more preferably at least about 60%, even more preferably at least about 70%, and further preferably at least about 80%, by weight of the biocide. Particularly preferred is BIT as an about 70-85% active paste. Sufficient biocide is added to provide a concentration in the final paint product of between about 0.005% to 2%, preferably about 0.01% to 0.2% of the biocide (by weight based on the total weight of the formulation).

The grind phase requires constant agitation with a high-shear impeller, such as a Cowles-type rotating blade. This part of the process is designed to create a system that effectively wets the dry pigments, then disagglomerates the primary pigment particles through application of high shearing force, and stabilizes the dispersion of these particles against reagglomeration, using appropriate surfactants, pigment dispersants, and neutralizers.

Pigments and all other solid materials should be sifted into the mix at a controlled rate to allow complete wetting of all solid particles. Although order of addition will vary depending upon specific formulation composition and process requirements, a typical order is as follows.

Water is added to a suitable mixing vessel. The volume used is in proportion to the amount of dry pigment to result in a high-solids, yet fluidized dispersion.

Thickener is then added to the vessel, and sufficient time is allowed for the grind mix to thicken, although the subsequent addition of neutralizer may be advantageous for viscosity development. Agitation speed is increased as viscosity increases to maintain a uniform mixture.

Surfactants and pigment dispersants are then added, followed by defoamer, co-solvent, coalescent, and neutralizers.

The dry pigments are then added to the grind phase and the agitation speed is increased as the viscosity and solids level increase during the pigment addition, so that uniform mixing is maintained throughout the process.

The biocide may be added at any point during the grind phase, but is preferably added along with the dry pigments.

Rinse water may be added at various points in the process for quantitative transfer of raw materials from holding tanks and process lines, etc., and for cleaning pigment solids from surfaces of the mixing vessel and the rotating shaft of the agitator. However, the total rinse water volume should be limited to maintain sufficiently high solids for an effective grind process.

The final grind mix is agitated at high speed for a period of time to accomplish complete disagglomeration of the primary pigment particles and formation of a stable dispersion. The mechanical energy thus put into the system may increase the temperature to well above ambient. Temperature therefore may be monitored if thermal stability of any formulation materials is a concern. Completion of the grind process may be determined with a fineness of grind gage to confirm sufficient dis-agglomeration of pigment particles.

The letdown step of the paint manufacturing process involves incorporation of the latex resins, any predispersed pigments, and the remaining formulation materials, which only require mixing agitation and perhaps moderate shear, as opposed to high shear. Latex resins are aqueous dispersions of organic polymeric particles. Common types of polymers include acrylics, vinyl acrylics, styrenated acrylics, and polyvinyl esters of versatic acid. Upon application and drying of the paint, the polymer particles coalesce to form a continuous coating of film over the substrate, and thus serve as the binding agent in the paint.

The letdown phase may be done either by sequentially adding the letdown components into a vessel containing the grind mix, by adding the grind mix into a vessel containing the letdown components, or by a combination of such sequences.

By way of example, a typical, although not required, procedure is to first add the latex resins to the grind mix, followed by other letdown compounds, generally in the following order: pigment slurries, coalescents (particularly if not included in the grind mix), and associative thickeners. Moderate shear is applied for a period of time to activate thickeners and allow viscosity to develop. Then neutralizer may be added, followed by water. Again, water may be added at other points as appropriate to maintain desired system viscosity through the process, and also as process rinse. Defoamer may be added as needed during the letdown process. Final viscosity and pH of the formulation are controlled with the thickener, neutralizer, and water, using further additions as needed.

It should be noted that the foregoing lists of typical grind phase and letdown components are provided for example only and not all such components will be required in every latex paint formulation, and additional components not described here may be included as well. A person of ordinary skill in the art can readily determine which components to include for a particular application.

The following examples are presented as illustrative of the invention but are not intended to limit its scope.

EXAMPLES

Several lab-scale batches of a low-VOC semi-gloss latex paint formulation are prepared to evaluate the bactericidal efficacy of 1,2-benzisothiazol-3(H)-one (BIT) when added as a solid powder to the grind mix, relative to its performance when added during the letdown as a 20% solution in dipropylene glycol and water. Each batch of paint contains 500 ppm (0.05 weight %) of the BIT active (w/w % relative to total formulation). Replicate batches are made with each of these forms of BIT, incorporated in their respective manners. A Control batch is also prepared where no BIT is added.

Table 1A and 1B show the two formulations, with components listed in the order they are added. Grinds (Table 1A) and letdowns (Table 1B) are prepared in stainless steel beakers with a high-speed mixer with a 2-inch diameter Cowles-type blade.

| Generic name | Tradename | Formula I 20% BIT solution Amount (g) | Formula II BIT Paste Amount (g) |
|---|---|---|---|
| Table 1A. | | | |
| Grind | | | |
| water | | 264.3 | 198.2 |
| Associative thickener #1 | acrylic polymer emulsion | UCAR Polyphobe TR-116 (1) | 10.9 | 8.2 |
| pigment dispersant | functionalized acrylic polymer solution | Tamol 1124 (2) | 4.8 | 3.6 |
| Anionic surfactant | phosphate ester surfactant | Strodex PK-95G (3) | 2.0 | 1.5 |
| nonionic surfactant | alkaryl polyether surfactant | Triton CF-10 (1) | 2.4 | 1.8 |
| defoamer | petroleum distillates with hydrophobic silica | Rhodoline 643 (4) | 6.4 | 4.8 |
| Co-solvent | Propylene glycol | | 9.6 | 7.2 |
| Neutralizer | 2-amino-2-methyl-1-propanol, with 5% water | AMP-95 (1) | 8.4 | 6.3 |
| opacifying pigment | titanium dioxide, rutile | TiPure R-706 (5) | 376.0 | 282.0 |
| biocide, BIT solid powder (85% active) (1) | 1,2-benzisothiazol-3(H)-one | | 0.00 | 0.75 |
| extender pigment | kaolin clay | Polygloss 90 (6) | 56.0 | 42.0 |
| grind mix subtotal | | | 740.80 | 556.4 |
| Table 1B. | | | |
| Letdown | | | |
| grind mix transferred | | | 277.8 | 278.2 |
| water | | | 14.0 | 14.0 |
| Latex resin | vinyl acrylic latex | UCAR Latex 300 (1) | 289.2 | 289.2 |

-continued

|  | Generic name | Tradename | Formula I 20% BIT solution Amount (g) | Formula II BIT Paste Amount (g) |
|---|---|---|---|---|
| Coalescent, | 2,2,4-trimethyl-1,3-pentanediol monoisobutyrate | Texanol Ester Alcohol (7) | 2.9 | 2.9 |
| Associative thickener #2 | acrylic polymer emulsion | UCAR Polyphobe TR-117 (1) | 6.8 | 6.8 |
| biocide, BIT 20% solution | 1,2-benzisothiazol-3(H)-one |  | 1.60 | 0.00 |
| defoamer | petroleum distillates with hydrophobic silica | Rhodoline 643 (4) | 1.2 | 1.2 |
| water |  |  | 46.1 | 47.0 |
| Formula total |  |  | 639.6 | 639.3 |

(1) Products of The Dow Chemical Company and its subsidiaries.
(2) Product of Rohm and Haas.
(3) Product of Dexter Chemical, LLC.
(4) Product of Rhodia.
(5) Product of DuPont Chemicals.
(6) Product of J. M. Huber Corporation.
(7) Product of Eastman Chemical.

One stock grind mix is prepared for Formulation I in a 1200 mL beaker, from which aliquots are transferred to two 600 mL beakers for the letdowns. Addition of BIT solution to these two separate letdown vessels requires separately weighed doses, thus providing a check against weighing imprecision. Separate grinds are prepared for the two replicates for Formulation II. In this case, the BIT paste is premixed with the pigment (titanium dioxide), and added together to minimizes losses during addition.

The five paint samples, Formulation I #1, Formulation I #2, Formulation II #1, Formulation II #2, Control, are tested for long-term preservation efficacy using a four-cycle challenge test, commonly used in the paint industry to assess preservative efficacy.

Twenty-four hour tryptic soy broth cultures are combined in equal parts for formulation inoculation at a final concentration of $5 \times 10^6$ CFU/ml. Organisms utilized: *Pseudomonas aeruginosa* (ATCC#15442), *Pseudomonas aeruginosa* (ATCC#10145), *Enterobacter aerogenes* (ATCC#13048), *Escherichia coli* (ATCC#11229), *Klebsiella pneumoniae* (ATCC#8308), *Staphylococcus aureus* (ATCC#6538), *Salmonella* choleraesuis (ATCC#10708).

Testing begins (day 0) by dosing the preserved samples with a pool of the above listed bacterial organisms ($5 \times 10^6$ CFU/ml) followed by equivalent inoculations on days 2, 7, and 14 of the 28 day study. To determine the extent of contamination, an aliquot of each sample is taken on days 0, 1, 2, 3, 6, 8, 13, 15, 20, 27 and used to determine an approximate bacterial concentration. Samples are scored on a scale of 0 to 8 and represent the average value of triplicate experiments (Table 2). A score of 0 to 2.9 has been established as the threshold for passing and indicates that few or no bacteria are present in the sample.

Note that transient ratings greater than 2.9 are normal for many applications and may reflect a slow onset of biocide action directly following a bacterial inoculation. However, transient high ratings do not necessarily indicate a lack of preservative efficacy.

TABLE 2

Microbiology rating scale for bacterial contamination.

| Score | Approximate CFU/ml |
|---|---|
| 0 | <50 |
| 1 | $5 \times 10^1$-$5 \times 10^2$ |
| 2 | $5 \times 10^2$-$5 \times 10^3$ |
| 3 | $5 \times 10^3$-$5 \times 10^4$ |
| 4 | $5 \times 10^4$-$5 \times 10^5$ |
| 5 | $5 \times 10^5$-$5 \times 10^6$ |
| 6 | $5 \times 10^6$-$5 \times 10^7$ |
| 7 | $5 \times 10^7$-$5 \times 10^8$ |
| 8 | $>5 \times 10^8$ |

Table 3, illustrates the results of the microbiological challenge testing. While transient contamination is seen on days 1 and 2 for Formulation II, #2, this is commonly seen in microbiological evaluations. The data clearly shows that all four formulations are well preserved and do not support bacterial grow, independently of the way the BIT is added. The Control sample supports bacterial growth throughout the study, demonstrating that BIT provides the antibacterial preservation.

TABLE 3

Results for the 4-cycle challenge evaluation of the five paint samples.

| Samples | Day 0 | Day 1 | Day 2 | Day 3 | Day 6 |
|---|---|---|---|---|---|
| Formulation I #1 | 5 | 0 | 0 | 1 | 1 |
| Formulation I #2 | 5 | 0 | 0 | 0 | 0 |
| Formulation II #1 | 5 | 0 | 0 | 0 | 0 |
| Formulation II #2 | 5 | 5 | 2 | 0 | 0 |
| Control | 5 | 5 | 5 | 5 | 5 |

| Samples | Day 7/8 | Day 13 | Day 14/15 | Day 20 | Day 27 |
|---|---|---|---|---|---|
| Formulation I #1 | 0 | 0 | 0 | 0 | 0 |
| Formulation I #2 | 0 | 0 | 0 | 0 | 0 |
| Formulation II #1 | 0 | 0 | 0 | 0 | 0 |

TABLE 3-continued

Results for the 4-cycle challenge evaluation of the five paint samples.

| Formulation II #2 | 0 | 0 | 0 | 0 | 0 |
| Control | 5 | 5 | 5 | 5 | 5 |

While the invention has been described above according to its preferred embodiments, it can be modified within the spirit and scope of this disclosure. This application is therefore intended to cover any variations, uses, or adaptations of the invention using the general principles disclosed herein. Further, the application is intended to cover such departures from the present disclosure as come within the known or customary practice in the art to which this invention pertains and which fall within the limits of the following claims.

What is claimed is:

1. A process for manufacturing a paint composition, the process comprising:
preparing a grind phase by mixing together one or more pigments, other grind phase components, and a water insoluble biocide formulation; and
mixing the grind phase with a one or more latex resins and other letdown components,
wherein the water insoluble biocide formulation comprises at least 50% by weight of a biocide; and wherein the biocide is 1,2-benzisothiazol-3(2H)-one.

2. A grind phase for use in a latex paint manufacturing process, comprising:
one or more pigments;
grind phase components; and
a water insoluble biocide formulation,
wherein the water insoluble biocide formulation comprises at least 50% by weight of a biocide;
wherein the grind phase components are selected from one or more of: water, co-solvents, coalescents, thickeners, surfactants, pigment dispersants, neutralizers, and defoamers;
and wherein the biocide is 1,2-benzisothiazol-3(2H)-one the biocide is 1,2-benzisothiazol-3(2H)-one.

3. A process according to claim 1 wherein the biocide is a high solids material comprising at least 80% by weight of the biocide.

4. A grind phase according to claim 2 wherein the biocide is a high solids material comprising at least 80% by weight of the biocide.

* * * * *